US009626623B2

United States Patent
Lightner et al.

(10) Patent No.: US 9,626,623 B2
(45) Date of Patent: *Apr. 18, 2017

(54) METHOD OF AUTOMATED DISCOVERY OF NEW TOPICS

(71) Applicant: QBASE, LLC, Reston, VA (US)

(72) Inventors: Scott Lightner, Leesburg, VA (US); Franz Weckesser, Spring Valley, OH (US); Sanjay Boddhu, Dayton, OH (US); Robert Flagg, Portland, ME (US)

(73) Assignee: QBase, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,631

(22) Filed: Oct. 21, 2015

(65) Prior Publication Data

US 2016/0042276 A1    Feb. 11, 2016

Related U.S. Application Data

(63) Continuation of application No. 14/873,635, filed on Oct. 2, 2015, which is a continuation of application
(Continued)

(51) Int. Cl.
*G06F 15/18* (2006.01)
*G06N 5/02* (2006.01)
(Continued)

(52) U.S. Cl.
CPC .............. *G06N 5/022* (2013.01); *G06F 17/20* (2013.01); *G06F 17/2705* (2013.01);
(Continued)

(58) Field of Classification Search
None
See application file for complete search history.

(56) References Cited

U.S. PATENT DOCUMENTS 6,128,660 A    10/2000  Grimm et al.
6,178,529 B1    1/2001  Short et al.
(Continued)

FOREIGN PATENT DOCUMENTS

WO    2013/003770 A2    1/2013

OTHER PUBLICATIONS

Jorg Becker, Dominik Kuropka, Witlod Ambramowicz, Gary Klein (eds.), "Topic-based Vector Space Model," Business Information Systems, Proceedings of BIS 2003, Colorado Springs, USA.
(Continued)

*Primary Examiner* — Luis Sitiriche
(74) *Attorney, Agent, or Firm* — Eric L. Sophir; Dentons US LLP (57) ABSTRACT

The present disclosure relates to a method for performing automated discovery of new topics from unlimited documents related to any subject domain, employing a multi-component extension of Latent Dirichlet Allocation (MC-LDA) topic models, to discover related topics in a corpus. The resulting data may contain millions of term vectors from any subject domain identifying the most distinguished co-occurring topics that users may be interested in, for periodically building new topic ID models using new content, which may be employed to compare one by one with existing model to measure the significance of changes, using term vectors differences with no correlation with a Periodic New Model, for periodic updates of automated discovery of new topics, which may be used to build a new topic ID model in-memory database to allow query-time linking on massive data-set for automated discovery of new topics.

18 Claims, 3 Drawing Sheets

Related U.S. Application Data

No. 14/558,076, filed on Dec. 2, 2014, now Pat. No. 9,177,262.

(60) Provisional application No. 61/910,763, filed on Dec. 2, 2013.

(51) Int. Cl.
| | | |
|---|---|---|
| *G06F 17/20* | (2006.01) | |
| *G06N 99/00* | (2010.01) | |
| *G06N 5/04* | (2006.01) | |
| *G06F 17/27* | (2006.01) | |
| *G06F 17/30* | (2006.01) | |

(52) U.S. Cl.
CPC .. *G06F 17/30011* (2013.01); *G06F 17/30598* (2013.01); *G06N 5/04* (2013.01); *G06N 99/005* (2013.01)

(56) References Cited

U.S. PATENT DOCUMENTS

| | | |
|---|---|---|
| 6,266,781 B1 | 7/2001 | Chung et al. |
| 6,353,926 B1 | 3/2002 | Parthesarathy et al. |
| 6,738,759 B1 | 5/2004 | Wheeler et al. |
| 6,832,373 B2 | 12/2004 | O'Neill |
| 6,832,737 B2 | 12/2004 | Karlsson et al. |
| 7,058,846 B1 | 6/2006 | Kelkar et al. |
| 7,370,323 B2 | 5/2008 | Marinelli et al. |
| 7,421,478 B1 | 9/2008 | Muchow |
| 7,447,940 B2 | 11/2008 | Peddada |
| 7,543,174 B1 | 6/2009 | van Rietschote et al. |
| 7,681,075 B2 | 3/2010 | Havemose et al. |
| 7,818,615 B2 | 10/2010 | Krajewski et al. |
| 7,899,871 B1 | 3/2011 | Kumar et al. |
| 8,055,933 B2 | 11/2011 | Jaehde et al. |
| 8,090,717 B1 | 1/2012 | Bharat et al. |
| 8,122,026 B1 | 2/2012 | Laroco et al. |
| 8,122,047 B2 | 2/2012 | Kanigsberg et al. |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,645,298 B2 | 2/2014 | Hennig et al. |
| 8,726,267 B2 | 5/2014 | Li et al. |
| 8,782,018 B2 | 7/2014 | Shim et al. |
| 8,972,396 B1 | 3/2015 | Zhang et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 2001/0037398 A1 | 11/2001 | Chao et al. |
| 2002/0031260 A1 | 3/2002 | Thawonmas et al. |
| 2002/0165847 A1 | 11/2002 | McCartney et al. |
| 2002/0174138 A1 | 11/2002 | Nakamura |
| 2003/0028869 A1 | 2/2003 | Drake et al. |
| 2003/0112792 A1 | 6/2003 | Cranor et al. |
| 2003/0158839 A1 | 8/2003 | Faybishenko et al. |
| 2003/0182282 A1 | 9/2003 | Ripley |
| 2004/0010502 A1 | 1/2004 | Bomfim et al. |
| 2004/0027349 A1 | 2/2004 | Landau et al. |
| 2004/0049478 A1 | 3/2004 | Jasper et al. |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2004/0243645 A1 | 12/2004 | Broder et al. |
| 2005/0192994 A1 | 9/2005 | Caldwell et al. |
| 2006/0101081 A1 | 5/2006 | Lin et al. |
| 2006/0122978 A1 | 6/2006 | Brill et al. |
| 2006/0294071 A1 | 12/2006 | Weare et al. |
| 2007/0005639 A1 | 1/2007 | Gaussier et al. |
| 2007/0005654 A1 | 1/2007 | Schachar et al. |
| 2007/0073708 A1 | 3/2007 | Smith et al. |
| 2007/0156748 A1 | 7/2007 | Emam et al. |
| 2007/0174167 A1 | 7/2007 | Natella et al. |
| 2007/0203693 A1 | 8/2007 | Estes |
| 2007/0203924 A1 | 8/2007 | Guha et al. |
| 2007/0240152 A1 | 10/2007 | Li et al. |
| 2007/0250501 A1 | 10/2007 | Grubb et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2008/0077570 A1 | 3/2008 | Tang et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0144609 A1 | 6/2009 | Liang et al. |
| 2009/0216734 A1 | 8/2009 | Aghajanyan et al. |
| 2009/0222395 A1 | 9/2009 | Light et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0161566 A1 | 6/2010 | Adair et al. |
| 2010/0223264 A1 | 9/2010 | Brucker et al. |
| 2010/0235311 A1 | 9/2010 | Cao et al. |
| 2010/0274785 A1 | 10/2010 | Procopiuc et al. |
| 2011/0047167 A1 | 2/2011 | Caceres |
| 2011/0071975 A1 | 3/2011 | Friedlander et al. |
| 2011/0093471 A1 | 4/2011 | Brockway et al. |
| 2011/0119243 A1 | 5/2011 | Diamond et al. |
| 2011/0125764 A1 | 5/2011 | Carmel et al. |
| 2011/0161333 A1 | 6/2011 | Langseth et al. |
| 2011/0282888 A1 | 11/2011 | Koperski et al. |
| 2011/0296390 A1 | 12/2011 | Vidal et al. |
| 2011/0296397 A1 | 12/2011 | Vidal et al. |
| 2011/0302163 A1* | 12/2011 | Rhinelander ..... G06F 17/30312 706/47 |
| 2012/0016875 A1 | 1/2012 | Jin et al. |
| 2012/0030220 A1 | 2/2012 | Edwards et al. |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0143911 A1 | 6/2012 | Liebald et al. |
| 2012/0246154 A1 | 9/2012 | Duan et al. |
| 2012/0310934 A1 | 12/2012 | Peh et al. |
| 2012/0323839 A1 | 12/2012 | Kiciman et al. |
| 2013/0036076 A1 | 2/2013 | Yang et al. |
| 2013/0132405 A1 | 5/2013 | Bestgen et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2013/0325660 A1 | 12/2013 | Callaway |
| 2013/0326325 A1 | 12/2013 | De et al. |
| 2014/0013233 A1 | 1/2014 | Ahlberg et al. |
| 2014/0022100 A1 | 1/2014 | Fallon et al. |
| 2014/0046921 A1 | 2/2014 | Bau |
| 2014/0089237 A1 | 3/2014 | Adibi |
| 2014/0156634 A1 | 6/2014 | Buchmann et al. |
| 2014/0244550 A1 | 8/2014 | Jin et al. |
| 2014/0255003 A1 | 9/2014 | Abramson et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0154079 A1 | 6/2015 | Lightner et al. |
| 2015/0154264 A1 | 6/2015 | Lightner et al. |
| 2015/0154297 A1 | 6/2015 | Lightner et al. |

OTHER PUBLICATIONS

International Search Report and Written Opinion dated Mar. 6, 2015 corresponding to International Patent Application No. PCT/US2014/067993, 9 pages.

(56) References Cited

OTHER PUBLICATIONS

International Search Report and Written Opinion dated Mar. 10, 2015 corresponding to International Patent Application No. PCT/US2014/067999, 10 pages.
International Search Report and Written Opinion of the International Searching Authority dated Apr. 15, 2015 corresponding to International Patent Application No. PCT/US2014/068002, 10 pages.
International Search Report and Written Opinion dated Feb. 24, 2015 corresponding to International Patent Application No. PCT/US2014/067918, 10 pages.
International Search Report and Written Opinion dated Mar. 3, 2015 corresponding to International Patent Application No. PCT/US2014/067921, 10 pages.
International Search Report and Written Opinion of the International Searching Authority dated Apr. 15, 2015, corresponding to International Patent Application No. PCT/2014/067994, 9 pages.
Blei, D.M., et al., "Latent Dririchlet Allocation," Journal of Machine Learning Research, vol. 3, 2003, pp. 993-1022.
Chuang, S.L., et al., A Practical Web-based Approach to Generating Topic Hierarchy for Text Segments,' Institute of Information Science, Academia Sinica, Taiwan, R.O.C., 2004, pp. 127-136.
Wang, C., et al., "Automatic Online News Issue Construction in Web Environment," Tsinghuya Univ., Beijing, China, 2008, pp. 457-466.
Tunkelang, D., "Faceted Search," Morgan & Claypool Publ., 2009, pp. i-79.
Schuth, A., et al., "University of Amsterdam Data Centric Ad Hoc and Faceted Search Runs," ISLA, 2012, pp. 155-160.
Tools, Search Query Suggestions using ElasticSearch via Shingle Filter and Facets, Nov. 2012, pp. 1-12.
Vizard, The Rise of In-Memory Databases, Jul. 13, 2012, 3 pages.

* cited by examiner

$J$ = number of multi-document components.
$V^{(j)}$ = number of terms in the vocabulary of the $j$th component.
$D$ = number of documents.
$N$ = number of tokens in (a component) of a document (actually depends on both $j$ and $d$).
$K$ = number of topics.
$\alpha$ = hyperparameter on the mixing proportions ($K$-vector or scalar if symmetric).
$\eta^{(j)}$ = hyperparameter on the mixture components ($V^{(j)}$-vector or scalar if symmetric).
$\theta_d$ = the topic mixture proportion for document $d$.
$\phi_k^{(j)}$ = mixture component for the $j$the component of the $k$th topic.
$z_{d,n}^{(j)}$ = mixture indicator that chooses the topic for the $n$th word in $j$th component of document $d$.
$w_{d,n}^{(j)}$ = term indicator for the $n$th word in $j$th component of document $d$.

*FIG. 3*

METHOD OF AUTOMATED DISCOVERY OF NEW TOPICS

CROSS-REFERENCE TO RELATED APPLICATIONS

This application is a continuation of U.S. patent application Ser. No. 14/873,635, entitled "Method of Automated Discovery of New Topics," filed Oct. 2, 2015, which is a continuation of U.S. patent application Ser. No. 14/558,076, entitled "Method for Automated Discovery of New Topics," filed on Dec. 2, 2014, which is a non-provisional patent application that claims the benefit of U.S. Provisional Application No. 61/910,763, entitled "Method for Automated Discovery of New Topics," filed Dec. 2, 2013, each of which are hereby incorporated by reference herein in their entirety.

This application is related to U.S. application Ser. No. 14/557,794, entitled "Method for Disambiguating Features in Unstructured Text," filed Dec. 2, 2014; U.S. application Ser. No. 14/558,300, entitled "Event Detection Through Text Analysis Using Trained Event Template Models," filed Dec. 2, 2014; and U.S. application Ser. No. 14/557,906, entitled "Method of Automated Discovery of Topic Relatedness," filed Dec. 2, 2014; each of which are hereby incorporated by reference in their entirety.

FIELD OF THE DISCLOSURE

The present disclosure relates in general to data storage and more specifically to a method for performing automated discovery of new topics in a corpus.

BACKGROUND

As storage and availability of data grows, a large amount of time is spent identifying data relationships for discovery of new topics. Conventionally, the discovery of new topics is oftentimes performed manually by repetitive work leading to wasting valuable time of users.

Information can have great value. Assembling and maintaining a database to store information involves real costs, such as the costs to acquire information, the costs associated with physical assets used to house, secure, and make the information available, and labor costs to manage the information.

As computer processors are becoming more powerful, it would be particularly useful to save the time that an individual conventionally spends discovering new topics and identifying relationship criteria with existing models, or between the source and the target.

Oftentimes there are simple transformations, or complex topic identification across a large corpus of documents from any subject domain, requiring a lot of user's time for discovery of relationships associated with existing data.

Thus, there is a need for a simple and flexible method which assists users in connection with performing automated discovery of new topics, employing a new topic database for comparison with the existing topics for new application environments.

SUMMARY

Embodiments of the present disclosure provide a method for performing automated discovery of new topics from unlimited documents related to any subject domain, employing a multi-component extension of Latent Dirichlet Allocation (MC-LDA) topic models, to discover related topics in a corpus. The resulting data may contain millions of term vectors from any subject domain identifying the most distinguished co-occurring topics that users may be interested in, which may be employed to create a Master Topic Model.

In accordance with one aspect of the present disclosure, the method for automated discovery of new topics may include multiple topic identification models with different number of term vectors and other parameters. For example a topic identification model with 64 term vectors may provide a broader topic scope, while models with 256, 1024, or 16K term vectors may provide more specific fine-grained topics.

According to another embodiment, a new data may contain a large number of entities/topics in a database, which may be used periodically to parse and extract data from topics that users may be interested in. This method may identify term vectors to change detection using term vector differences with no correlation in the Master Topic Model to compare and measure the significance of these changes, based on established thresholds to identify the similarity of the topics found by comparing one by one with topics from Periodic New model.

The present disclosure may provide a method for automated discovery of new topics in a corpus, using new content and comparing it to the existing model for periodically building new topic ID model database compressed into the smallest memory footprint possible, for providing fuzzy indexing to allow query-time linking on massive data sets, providing reliability and fault-tolerance through data, which may prevent software and hardware redundancy.

In one embodiment, a method comprises automatically extracting, by a database source computer, from a document corpus, data associated with a plurality of co-occurring topics; in response to automatically extracting the plurality of co-occurring topics, extracting, by a synchronizing framework computer, a plurality of topic identifies from the plurality of co-occurring topics; creating, by the synchronizing framework computer, a master topic computer model for the document corpus from a first plurality of term vectors; creating, by the synchronizing framework computer, a periodic new topic computer model by comparing topic significance among the plurality of topic identifiers, the periodic new topic computer model including a second plurality of term vectors; and selecting, by the synchronizing framework computer, one or more new topics by identifying one or more term vectors from the second plurality of term vectors in the periodic new topic computer model that have no correlation with the first plurality of term vectors in the master topic computer model.

In another embodiment, a system comprises a database source computer module configured to extract data associated with a plurality of co-occurring topics in a document corpus; and a synchronizing framework computer module configured to: (a) extract a plurality of topic identifies from the plurality of co-occurring topics; (b) create a master topic computer model for the document corpus from a first plurality of term vectors; (c) create a periodic new topic computer model by comparing topic significance among the plurality of topic identifiers, the periodic new topic computer model including a second plurality of term vectors; and (d) select one or more new topics by identifying one or more term vectors from the second plurality of term vectors in the periodic new topic computer model that have no correlation with the first plurality of term vectors in the master topic computer model.

In another embodiment, a non-transitory computer readable medium having stored thereon computer executable instructions executed by a processor comprises automatically extracting, by a processor executing a database source computer module, from a document corpus data associated with a plurality of co-occurring topics; in response to automatically extracting the plurality of co-occurring topics, extracting, by the processor executing a synchronizing framework computer module, a plurality of topic identifies from the plurality of co-occurring topics; creating, by the processor executing the synchronizing framework computer, a master topic computer model for the document corpus from a first plurality of term vectors; creating, by the processor executing the synchronizing framework computer, a periodic new topic computer model by comparing topic significance among the plurality of topic identifiers, the periodic new topic computer model including a second plurality of term vectors; and selecting, by the processor executing the synchronizing framework computer, one or more new topics by identifying one or more term vectors from the second plurality of term vectors in the periodic new topic computer model that have no correlation with the first plurality of term vectors in the master topic computer model.

Numerous other aspects, features, and benefits of the present disclosure may be made apparent from the following detailed description taken together with the drawing features.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

GLOSSARY OF TERMS

As used herein, the following terms have the following definitions:

"Parse" refers to analyzing the source code of a computer program to make sure that it is structurally correct before it is compiled and turned into machine code.

"Term vector" refers to an algebraic model for representing text documents (and any objects, in general) as vectors of identifiers, such as, for example, index terms. It is used in information filtering, information retrieval, indexing, and relevancy rankings.

"Database" refers to any system including any combination of clusters and modules suitable for storing one or more collections and suitable to process one or more queries.

"Document" refers to a discrete electronic representation of information having a start and end.

"Multi-Document" refers to a document with its tokens, different types of named entities, and key phrases organized into separate "bag-of-surface-forms" components.

"Corpus" refers to a collection of one or more documents.

"Feature" refers to any information which is at least partially derived from a document.

"Cluster" refers to a collection of features.

"Memory" refers to any hardware component suitable for storing information and retrieving said information at a sufficiently high speed.

"Module" refers to a computer software and/or hardware component suitable for carrying out one or more defined tasks.

"Topic" refers to a set of thematic information which is at least partially derived from a corpus.

"Query" refers to a request to retrieve information from one or more suitable databases.

Description of Exemplary Embodiments

Various aspects of the present disclosure describe a system and method for automated discovery of new topics in a corpus based on a concept of co-occurring topics from different pre-built topic models. These different topic models are built with different levels of granularity of topics, vocabulary and converging parameters, thus providing a vertical hierarchy/scalability over a specific domain of interest. Embodiments of the present disclosure extend the conventional LDA topic modeling to support multi component LDA, where each component is treated as conditionally-independent, given document topic proportions. These components can include features like terms, key phrases, entities, facts, among others. Thus, this approach provides a concept of horizontal scalability of the topic models over a specific domain. The combination of the vertical vocabulary and horizontal feature selection in the pre-built topic models, provides varied dimensions of co-occurring topics, which on appropriate clustering and differential training via MEMDB can produce new topics. These new topics would not exists in the pre-built topic models to begin with, but could be discovered by running the documents in parallel across all the pre-built topic models.

Embodiments of the present disclosure describe a computer executed method for automated discovery of new topics that may facilitate the automated determination of relationships of corresponding term vectors from any subject domain identifying the most distinguished co-occurring topics that users may be interested in, which may be employed to create a Master Topic Model.

According to an embodiment, a term vector component may be a search component configured to return information about documents. In the term vector space model of information retrieval, the documents are modeled as vectors in a high-dimensional space of millions of terms. The terms are derived from words and phrases in the document, which are weighted by their importance within the document and within the corpus of documents. Each document's vector seeks to represent the document in a "vector space," allowing comparison with vectors derived from other sources, for example, queries, or other documents. Term vectors may be used as the basis of successful algorithms for document ranking, document filtering, document clustering, and relevance feedback.

The embodiments recite a procedure for automated discovery of new topics in a corpus based on a concept of co-occurring topics from different pre-built topic models. These different topic models are built with different levels of granularity of topics, vocabulary, and converging parameters, thereby providing a vertical hierarchy/scalability over a specific domain of interest. The embodiments can extend LDA topic modeling to support multi-component LDA, where each component is treated as conditionally-independent, given document topic proportions. These components can include features, such as terms, key phrases, entities, facts, etc. Thus, this approach can provide a concept of horizontal scalability of the topic models over a specific domain. The combination of the vertical vocabulary and horizontal feature selection in the pre-built topic models provides varied dimensions of co-occurring topics, which on appropriate clustering and differential training via an in-memory database can produce new topics. These new topics would not exist in the pre-built topic models, to begin with, but could be discovered by running the documents in parallel across all the pre-built topic models.

A System for Automated Discovery of New Topics

Figure 1:
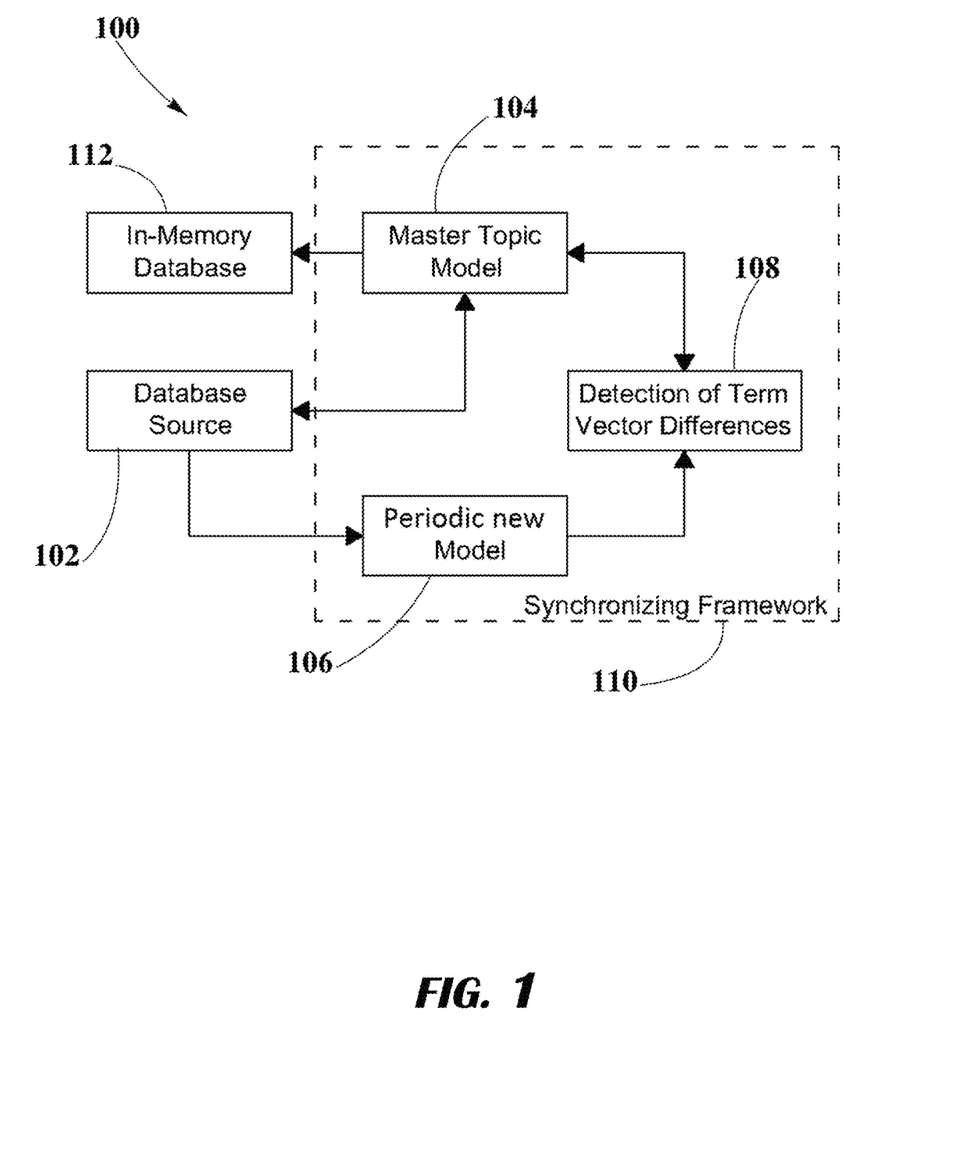
FIG. 1 is a diagram illustrating a system for automated discovery of new topics, according to an exemplary embodiment.

FIG. 1 illustrates a simplified block diagram of a system architecture 100 configured for automated discovery of new topics, from millions of documents related to any subject domain utilizing a Multi-Component Latent Dirichlet Allocation (MC-LDA) topic computer model, or similar suitable process to discover related topics in a corpus for periodically building new topic ID models, using new content and comparing it to the existing model.

In accordance with one aspect of the present disclosure, the system for automated discovery of new topics may include one or more central servers having a plurality of special purpose software and hardware computer modules, including a database source module 102 which may contain a large number of entities/topics that users may be interested in. The resulting data may contain a large number of term vectors from any subject domain identifying the most distinguished co-occurring topics that users may be interested in, which may be employed to implement a Master Topic Model computer module 104.

Although the system architecture 100 includes a single database source module 102 and a single destination in-memory database module 112, it is to be understood and appreciated that the novel functionality of a system and method for automatic discovery of new topics may be employed with any number of sources and/or destination components, which may be remotely located and accessed.

Embodiments of the present disclosure may be directed to a system and method for automated discovery of new topics, which may include multiple topic identification models with different numbers of term vectors and other parameters. For example, a topic identification model with 64 term vectors may provide a broader topic scope, while models with 256, 1024, or 16K term vectors may provide more specific fine-grained topics. Each topic or document may be analyzed on co-occurring topics across models to discover related topics characterized by a particular set of term vectors, making each individual word exchangeable, having good probabilities of generating new term vectors facilitating the automated discovery of new topics.

According to principles of the present disclosure, the system and method for automated discovery of new topics periodically may use new data in the database source module 102 to select data of interest or item feature.

This information may be used periodically to parse and extract data from topics that users may be interested in, to compare all term vectors from Master Topic Model module 104 with no correlation with term vectors of Periodic New Model module 106 employing a Detector of Term Vector Differences module 108. The system measures the significances of the changes by comparing each term vector one by one, selecting the more specific term vectors that do not correlate or have similarities with Master Topic Model 104, employing different methods or any suitable method existing for this type of comparison.

An embodiment of the present disclosure may include a synchronization frame work computer module 110 which may be a framework of data collection interfaces that may communicate with database source computer module 102 and pull data items that may contain relevant information to a project. Employing this process may generate a new set of topics to produce from zero to unlimited number of topics, which may be added to Master Topic Model 104 for periodical updates of automated discovery of new topics in a corpus, using the new content and comparing it to the existing model for periodical building of new topic ID model in-memory database 112. The in-memory database 112 may be compressed into the smallest memory footprint possible for providing fuzzy indexing to allow query-time linking on massive data-sets, providing reliability and fault tolerance through data for automated discovery of new topics in a corpus.

The actual software code or specialized control hardware used to implement these systems, modules and methods are not limiting the invention. Thus, the operation and behavior of the systems, modules and methods were described without reference to the specific software code, being understood that software and control hardware may be designed to implement the systems, modules and methods based on the description herein.

A Method for Automated Discovery of New Topics

Figure 2:
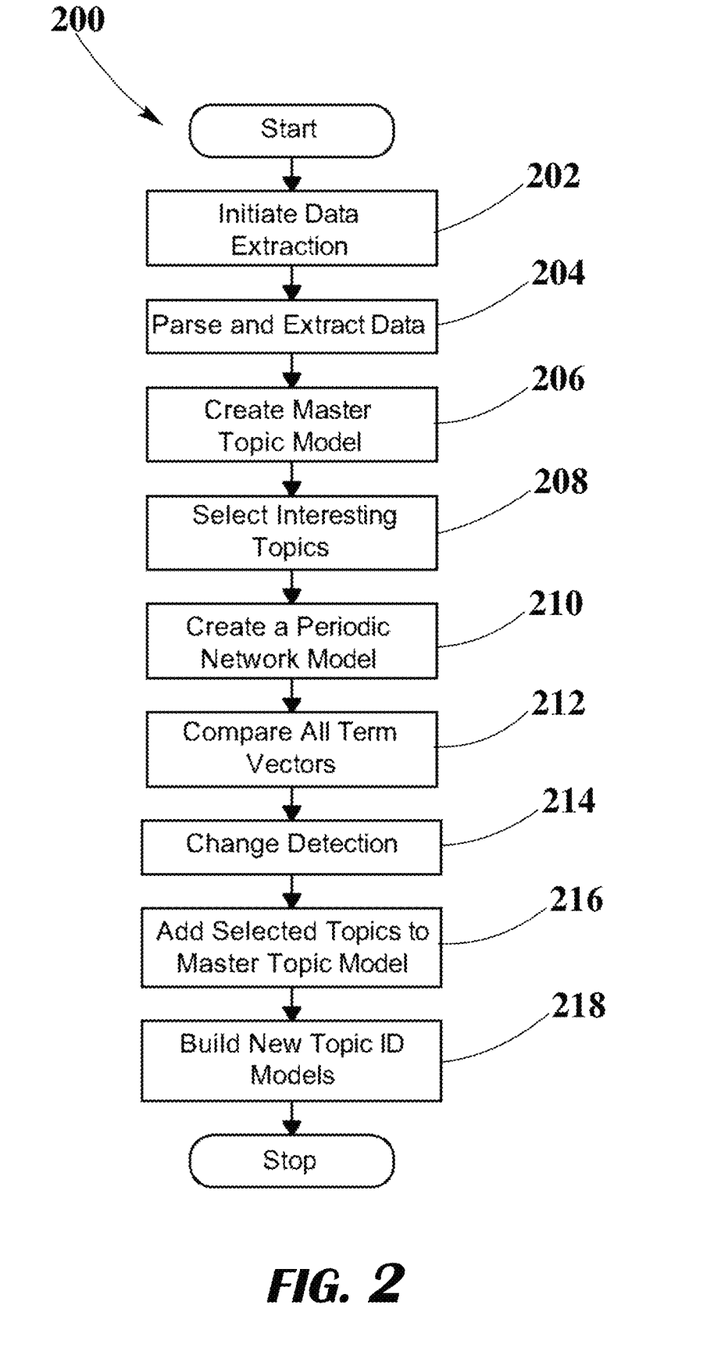
FIG. 2 is an exemplary flowchart of a computer executed method for automated discovery of new topics, according to an exemplary embodiment.

FIG. 2 illustrates a flowchart 200 of an embodiment of the methodology for automated discovery of new topics in accordance with one aspect of the present disclosure. For purposes of simplicity of explanation, one or more methodologies shown in the form of a flowchart may be described as a series of steps. It is to be understood and appreciated that the subject disclosure is not limited by the order of the steps, as some steps may occur in accordance with the present disclosure or in a different order and/or concurrency with other steps shown and described here. For example, those skilled in the art may understand and appreciate the methodology which may be represented as a series of interrelated states or events, such as in a state diagram. Moreover, not all illustrated acts may be required to implement a methodology in accordance with the present disclosure.

As may be seen in FIG. 2 the method for automatic discovery of new topics, may initiate data extraction in step 202, which may be configured to allow for custom entity extraction workflows for automated discovery of new topics. In an embodiment, a database source module 102 may be used to parse and extract data 204 of most distinguished concurring topics that a user may be interested in, employing LDA or similar suitable method to discover topics in a corpus, which, in step 206, may be employed by the synchronizing framework module 110 (FIG. 1) to create a Master Topic Model. Term vectors may be used as the basis of successful algorithms for document ranking and filtering.

In step 208, the method may periodically run a new set of data to select topics of interest from a very large collection of co-occurring entities extracted from a document corpus of the targeted domain. This new data may be analyzed to discover a relationship between data elements. In addition, topic identifiers may be extracted to improve precision for creation of a Periodic New Model, step 210, using a Detector of Term Vectors Differences module 108 of the synchronizing framework module 110 to compare and measure the significance of topics based on established thresholds, for periodically building new topic ID models using new content to identify the similarity of topics found. In step 212, term vectors from Periodic New Model having no correlation with term vectors of Master Topic Model are identified, where all term vectors are compared one by one with topics from Master Topic Model. In step 214, all differences may change detection of term vector differences.

The next step 216 involves the addition of selected topics to Master Topic Model, which, in step 218, may be used to periodically build a new topics ID model to compress data into smallest memory possible configured to fit into in-memory database 112. In embodiments, the in-memory database 112 may have an advanced searching and imbedded record linking capabilities to provide fuzzy indexing, matching and match scores and non-exclusionary searching to provide in-database analytics and to allow query-time linking on massive data-set for automated discovery of new topics.

Figure 3:
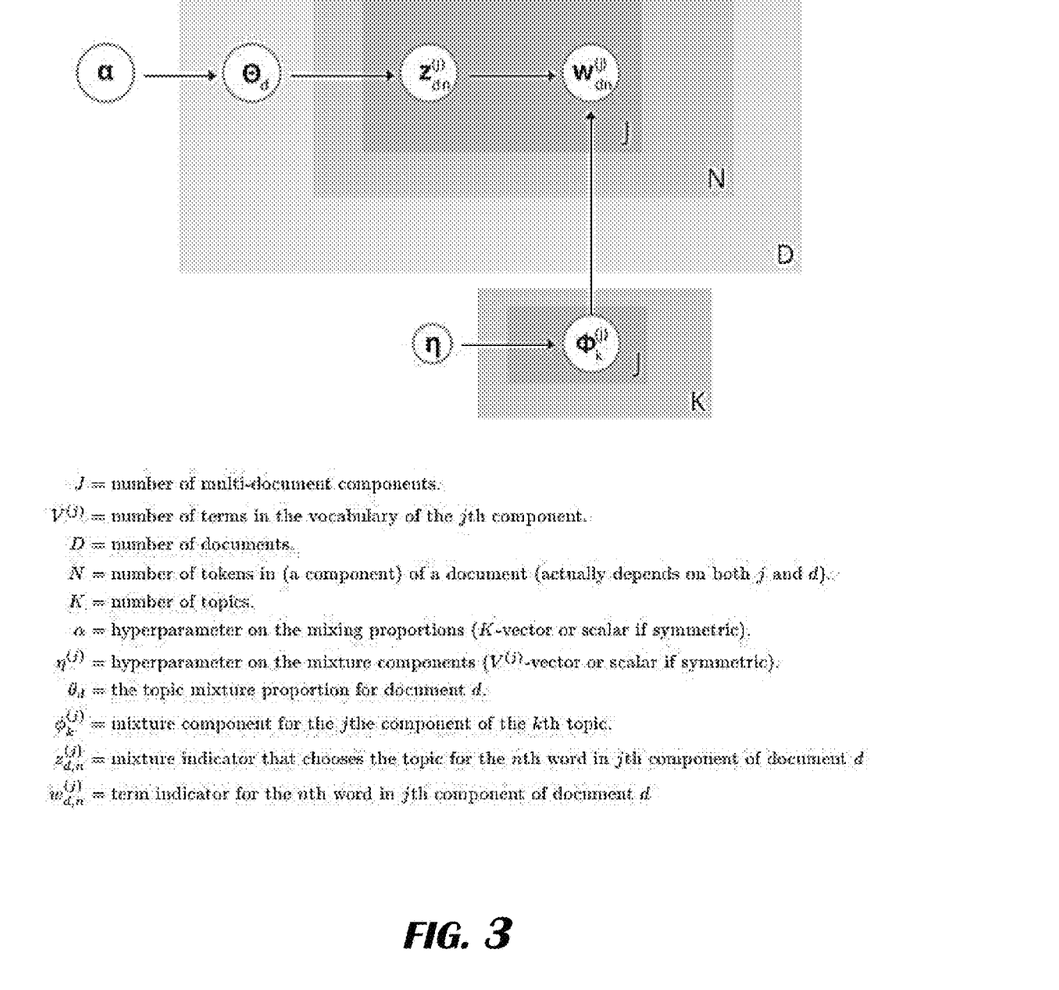
FIG. 3 is a diagram illustrating an embodiment of a directed graphical representation of a multi-component, conditionally-independent Latent Dirichlet Allocation (MC-LDA) topic model executed by one or more special purpose computer modules of FIG. 1, according to an exemplary embodiment.

FIG. 3 illustrates an embodiment of a multi-component, conditionally-independent Latent Dirichlet Allocation (MC-LDA) topic model executed by a special purpose computer module, such as Topic Modules 104, 106 discussed above in connection with FIG. 1, and initialized in accordance with the set forth parameters. In the illustrated embodiment, the MC-LDA model computer module provides a computer executed framework for horizontal scalability to add different components based on varied features, including entities, facts, key-phrases, and terms.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. may not be intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed.

What is claimed is:

1. A computer-implemented method comprising:
identifying, by a computer, in one or more document corpora of a data source, a topic of interest based upon one or more concurring topics identified in the one or more document corpora;
automatically extracting, by the computer, from a document corpus, data associated with a plurality of co-occurring topics based on the topic of interest;
in response to automatically extracting the data associated with the plurality of co-occurring topics, extracting, by the computer, a plurality of topic identifiers from the plurality of co-occurring topics;
generating, by the computer, a periodic topic model comprising a set of one or more term vectors by comparing topic significance among the plurality of topic identifiers;
periodically creating, by the computer, new topic ID models using data content in the periodic topic model by identifying a similarity of topics, wherein the new topic ID models are stored in an in-memory database; and
linking, by the computer, data in the in-memory database for automated discovery of new topics.

2. The method of claim 1, further comprising determining, by the computer, a relationship of corresponding term vectors from the plurality of co-occurring topics, each co-occurring topic of the plurality of co-occurring topics containing one or more term vectors.

3. The method of claim 2, further comprising generating, by the computer, a master topic computer model comprising a first set of one or more term vectors identified in text of the document corpus upon determining the relationship of the corresponding term vectors from the plurality of co-occurring topics.

4. The method of claim 3, further comprising selecting, by the computer, one or more new topics by identifying one or more term vectors from the set of the one or more term vectors in the periodic topic computer model that has no correlation with the first set of one or more term vectors in the master topic computer model.

5. The method of claim 3, further comprising adding, via the computer, one or more new topics to the master topic computer model.

6. The method of claim 1, wherein comparing the topic significance among the plurality of topic identifiers is based on a predetermined significance threshold.

7. The method of claim 3, wherein the master topic computer model is a multi-component extension of a Latent Dirichlet Allocation (MC-LDA) topic model.

8. The method of claim 1, wherein the periodic topic computer model is a multi-component extension of a Latent Dirichlet Allocation (MC-LDA) topic model.

9. The method of claim 1, wherein the set of the one or more term vectors in the periodic topic computer model corresponds to a second set of the one or more term vectors.

10. A system comprising:
a database source computer module configured to extract data associated with a plurality of co-occurring topics in a document corpus; and
one or more computers comprising one or more processors configured to:
identify, in the document corpus stored in the database source, an indication of a topic of interest;
automatically extract from a document corpus, data associated with a plurality of co-occurring topics based on the topic of interest;
extract a plurality of topic identifiers from the plurality of co-occurring topics in response to the extracting of the data associated with the plurality of co-occurring topics;
create a periodic topic model comprising a set of one or more term vectors by comparing topic significance among the plurality of topic identifiers;
periodically create new topic ID models using data content in the periodic topic model by identifying a similarity of topics, wherein the new topic ID models are stored in an in-memory database; and
link data in the in-memory database for automated discovery of new topics.

11. The system of claim 10, wherein the one or more computers are further configured to determine a relationship of corresponding term vectors from the plurality of co-occurring topics where each co-occurring topic of the plurality of co-occurring topics containing one or more term vectors.

12. The system of claim 11, wherein the one or more computers are further configured to generate a master topic computer model comprising a first set of one or more term vectors identified in text of the document corpus upon determining the relationship of the corresponding term vectors from the plurality of co-occurring topics.

13. The system of claim 12, wherein the one or more computers are further configured to select one or more new topics by identifying one or more term vectors from the set of the one or more term vectors in the periodic topic model that has no correlation with the first set of one or more term vectors in the master topic computer model.

14. The system of claim 12, wherein the one or more computers are further configured to add one or more new topics to the master topic computer model.

15. The system of claim 10, wherein comparing the topic significance among the plurality of topic identifiers is based on a predetermined significance threshold.

16. The system of claim 12, wherein the master topic computer model is a multi-component extension of a Latent Dirichlet Allocation (MC-LDA) topic model.

17. The system of claim 10, wherein the periodic topic computer model is a multi-component extension of a Latent Dirichlet Allocation (MC-LDA) topic model.

18. The system of claim 10, wherein the set of the one or more term vectors in the periodic topic computer model corresponds to a second set of the one or more term vectors.

* * * * *